Sept. 13, 1955  G. O. JOHNSON  2,717,679
CLUTCH WITH ANTI BACKLASH LOCK
Filed Aug. 10, 1953  2 Sheets-Sheet 1
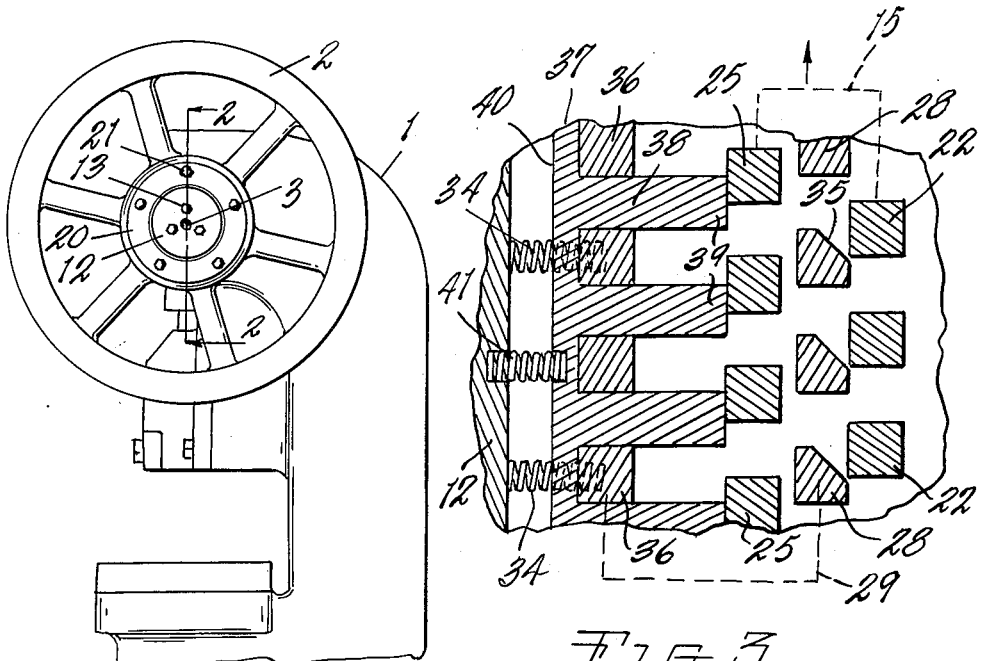
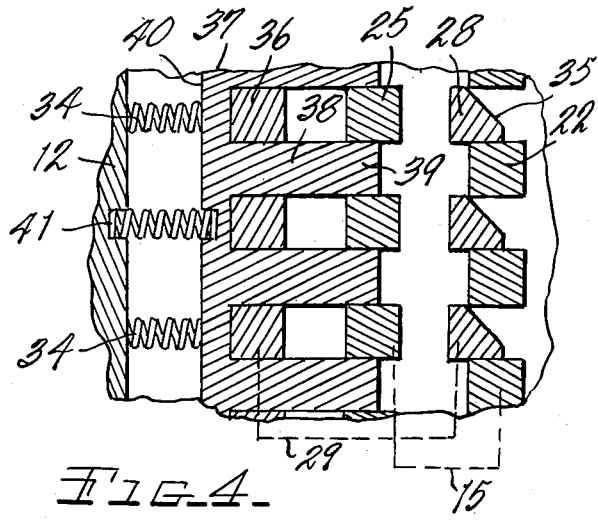
INVENTOR.
Gustaf O. Johnson
BY Otis A. Earl
Attorney.

Sept. 13, 1955 G. O. JOHNSON 2,717,679
CLUTCH WITH ANTI BACKLASH LOCK
Filed Aug. 10, 1953 2 Sheets-Sheet 2

INVENTOR.
Gustaf O. Johnson
BY
Otto A. Earl
Attorney.

United States Patent Office 2,717,679
Patented Sept. 13, 1955

2,717,679

CLUTCH WITH ANTIBACKLASH LOCK

Gustaf O. Johnson, Elkhart, Ind., assignor to Johnson Machine & Press Corporation, Elkhart, Ind.

Application August 10, 1953, Serial No. 373,138

14 Claims. (Cl. 192—67)

This invention relates to improvements in clutch with antibacklash lock.

The principal objects of this invention are:

First, to provide a clutch structure for positively engaging a rapidly rotating part with a previously stationary part so that the clutch connection will transmit loads in either direction between the parts without backlash.

Second, so provide a clutch having initially engaged teeth that are easily engaged by reason of having large clearance, the clutch further having secondarily engaging teeth that lock the parts against backlash.

Third, to provide a clutch structure particularly for a punch press drive which is relatively simple to manufacture, assemble and service while at the same time being quick and positive in its clutching action.

Fourth, to provide a clutch the teeth elements of which may be inexpensively formed by broaching the teeth of several elements simultaneously.

Other objects and advantages of the invention will be apparent from a consideration of the following description and claims. The drawings illustrate a highly practical form of the clutch.

Fig. 1 is a fragmentary side elevational view of a punch press having the clutch structure associated therewith.

Fig. 3 is a developed plan view of the coacting teeth of the clutch viewed in the disengaged positions of the teeth.

Fig. 4 is a developed plan view of the teeth in engaged position corresponding to the position taken by the teeth along the plane of the line 4—4 in Fig. 2.

Figure 2:
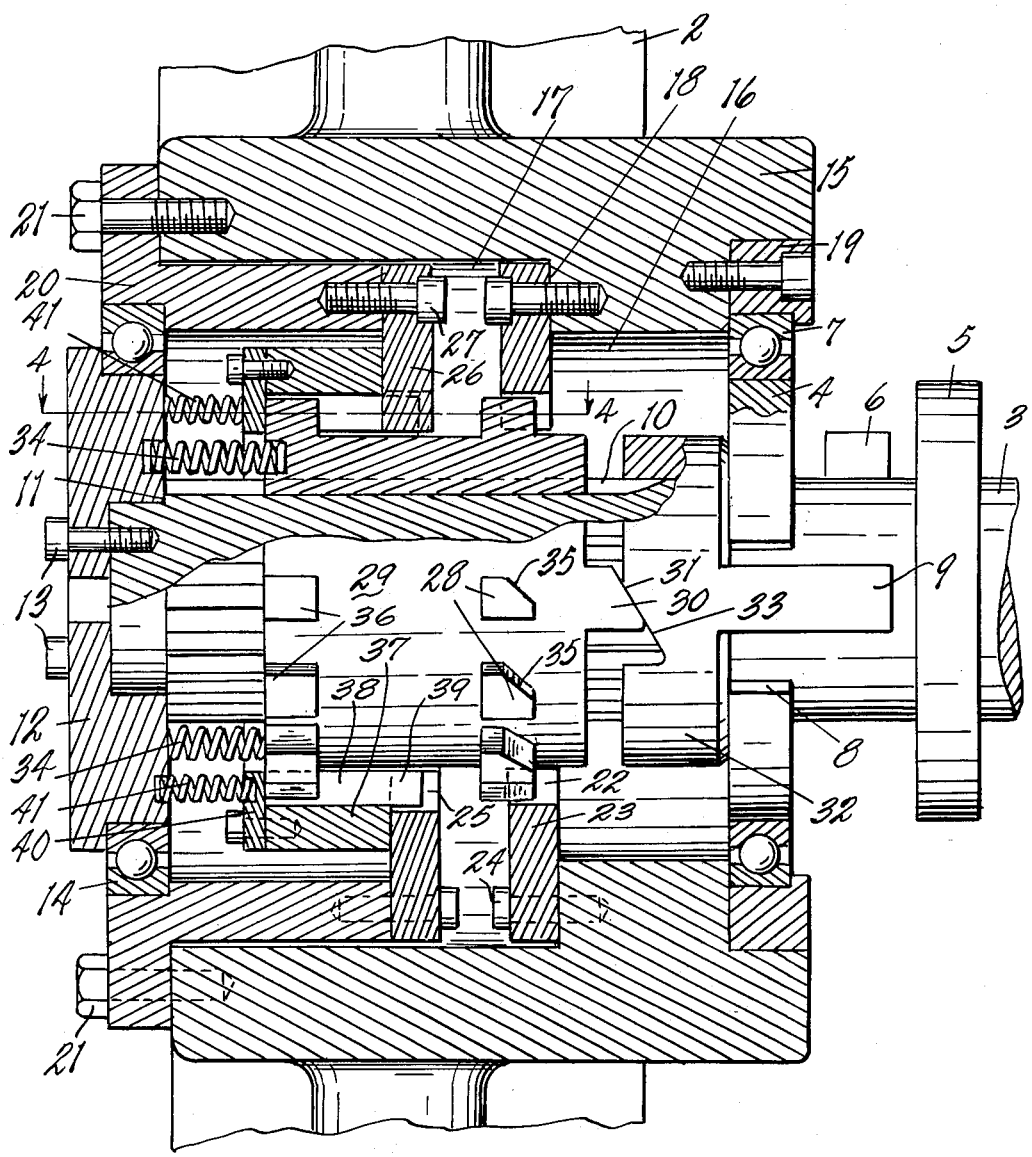
Fig. 2 is an enlarged fragmentary cross-sectional view taken along the plane of line 2—2 in Fig. 1, the view being partially broken away.

The present clutch structure constitutes an improvement of and incorporates many of the features of the clutch disclosed and claimed in my co-pending application Serial Number 250,275, filed October 8, 1951, for Clutch for Punch Press. As will hereinafter appear the present clutch is particularly adapted for use in punch presses where the clutch mechanism is subjected to reversal of stress as the ram of the press reaches the bottom of its stroke. However, the clutch structure claimed herein has utility in other connections where a releasable driving connection is to be made between two coaxial and relatively rotatable parts.

In the drawings the reference character 1 generally indicates a punch press having a driving fly-wheel 2 mounted on the press shaft 3. For purposes of description the exposed free end of the shaft will be designated as the outer end of the shaft while that portion of the shaft that extends into the press will be designated as the inner portion of the shaft. The several elements of the clutch and fly-wheel will be correspondingly oriented but it should be understood that the relative positions of the parts with respect to the machine may be reversed in many instances without departing from the theory of the invention as defined in the claims.

The shaft 3 is provided with spaced collars 4 and 5 adapted to embrace and guide the clutch actuating pawl 6 of the foregoing co-pending application. The outer flange 4 supports the inner race of a ball bearing assembly 7 and is radially slotted as at 8 to form a segmental notch through which the clutch actuating finger 9 projects. Outwardly from the collar 4 the shaft is splined as at 10 and shouldered on the outer end as at 11. The shouldered outer end of the shaft removably supports a bearing plate 12 secured in place by means of screws 13. The plate supports the inner race of an outer ball bearing assembly 14. Desirably the ball bearing assemblies 7 and 14 are of the same size and the collar 4 and bearing plate 12 are correspondingly sized.

The fly-wheel 2 has a central hub 15 that is axially bored as at 16 and counterbored from the outer end as at 17 to provide the outwardly facing shoulder 18. The inner bearing ring 19 set into the inner face of the hub coacts with the ball bearing assembly 7. An annular insert 20 secured in the outer end of the hub by the screws 21 coacts with the ball bearing assembly 14.

The hub 15 carries a first set of axially fixed clutch teeth 22 formed around the center of a ring 23. The ring 23 is removably secured to the shoulder 18 by screws 24. The second set of axially fixed clutch teeth 25 are formed around the center of a second ring 26 and the ring is secured to the inner end of the annular insert 20 by the screws 27 in axially spaced relation with the ring 23 and teeth 22. Desirably the rings 23 and 26 and the teeth thereon are identical in shape and size so that the teeth 22 and 25 may be formed simultaneously in a single broaching operation on the two rings. However the rings 23 and 26 are secured to the hub in angularly offset relation so that each tooth 25 is positioned axially in front of a space between the teeth 22.

The teeth 22 constitute the initially engaged driving teeth of the clutch while the teeth 25 form secondarily engaged locking teeth. The teeth 22 are drivingly connected to the shaft 3 by means of axially shiftable driven teeth 28 formed around the surface of a sleeve 29. The sleeve 29 is splined to the shaft on the splines 10 and so rotates with the shaft but is axially shiftable therealong. The sleeve 29 is provided with an inwardly projecting cam finger 30 having an axially cammed inner end 31. The cam finger 30 coacts with actuating ring 32 mounted around the shaft and bearing on its inner face against the collar 4. The previously mentioned actuating finger 9 is rigidly connected to the ring 32. The ring is angularly movable with respect to the shaft 3 but is limited in its rotation by engagement of the finger 9 with the end of the notch 8. The ring 32 has an axially cammed notch 33 formed therein that coacts with the cam finger 30.

It will thus be seen that lowering the trip pawl 6 into the path of the actuating finger 9 when the shaft and pawl are rotating will restrain the actuating finger and ring 32 relative to the shaft and will move the finger 9 against the bottom of the notch 8 as seen in Fig. 2. The cammed end 31 of the finger 30 will thus travel upwardly and outwardly along the cam notch 33 to move the sleeve 29 and teeth 28 axially outwardly and out of engagement with the teeth 22. The sleeve 29 is constantly biased inwardly toward clutch engaging position by a series of springs 34 bearing between the adjacent faces of the sleeve and the outer bearing plate 12.

Upon retraction of the pawl 6 from the actuating finger 9 the springs 34 exert such axial pressure on the sleeve 29 and cam face 31 to advance the ring 32 angularly with respect to the now stationary shaft and permit the finger 30 to enter into the notch 33. The teeth 28 are thus moved axially toward engagement with the driving teeth 22. In order to facilitate engagement of the teeth 28 with the rapidly rotating teeth 22 one or both of the relatively trailing edges of the teeth 28 and 22 are beveled as at 35. The beveled portions 35 create peripheral clearance between the teeth 28 and the teeth 22 to facilitate engagement of the teeth. Depending upon the rotational speed of the teeth 22 and the axial speed of the teeth 28 the teeth 22 and 28 may become engaged as shown in Fig. 4 with the beveled portions 35 clearing the trailing edges of the preceding teeth 22. In this position the clutch would drive in one direction only but reversal of the driving force in the clutched parts would result in noisy backlash and might even disengage the clutch by acting on the bevels 35.

The antibacklash elements of the clutch consist of a second set of driven teeth 36 formed on the outer end of the sleeve 29. The teeth 36 are aligned with and may be formed during the same operation that forms the teeth 28. A follower ring 37 is axially slidably mounted around the outer ends of the teeth 36. The center of the ring 37 is provided with a series of elongated teeth or jaws 38 that mesh with the teeth 36 and non-rotatably tie the follower ring to the sleeve 29. The inner ends of the jaws 38 project inwardly beyond the ring 37 in locking teeth 39 and are adapted to enter between and engage the axially fixed teeth 25 on the fly-wheel. The outer end of the ring 37 is provided with an annular end plate 40 that limits inward movement of the ring 37 and also forms an abutment for a series of coil springs 41. The ring 37 and teeth 39 are thus yieldably biased inwardly toward the plate 26 and teeth 25 independently of the sleeve 29 and teeth 28.

As is most readily apparent from a consideration of Figs. 3 and 4 the inner ends of the teeth 39 are urged by the springs 41 against the outer faces of the teeth 25 whenever inward movement of the sleeve 29 permits them. Further inward motion of the teeth 39 is prevented so long as the teeth 28 remain out of engagement with the teeth 22. However, as soon as the teeth 28 move angularly and axially into engagement with the teeth 22 the teeth 36 rotate the jaws 38 into alignment with the spaces between the teeth 25 and axially inward motion of the teeth 36 permits the springs 41 to slide the ring 37 and teeth 39 smoothly and quietly into firm locking engagement with the teeth 25. In its fully engaged position as described the clutch structure is capable of transmitting loads in either direction and does not have any objectionable backlash.

Having thus described the invention, what is claimed as new and what is desired to be secured by Letters Patent is:

1. A clutch for a punch press having a shaft and a fly-wheel comprising, a splined end portion on said shaft, a collar on said shaft at the inner end of said splined portion and having a segmental notch therein, an inner bearing supported on said collar, a chambered hub on said fly-wheel supported on its inner side on said bearing, a first ring secured within said hub portion and having radially inwardly projecting teeth formed around its interior and spaced radially outwardly from said splined portion, a sleeve axially slidably and non-rotatably mounted on said splined portion, a first set of teeth on said sleeve adapted to coact with said teeth on said first ring and having beveled trailing corners, an annular insert removably secured to the outer side of said hub and projecting thereinto, a second ring secured to the inner end of said insert and having radially inwardly facing teeth formed around its interior spaced axially outwardly from said first ring, said first and second rings and the teeth thereon being of identical size and number and being secured to said hub in angularly off-set position whereby the teeth on one ring overlap the space between the teeth on the other ring, a second set of teeth formed on said sleeve and spaced axially outwardly from said second ring, said first and second sets of teeth on said sleeve being axially and angularly aligned, a follower ring sleeved around the second set of teeth on said sleeve and having internal jaws fitting between said second set of teeth, locking teeth on the inner ends of said jaws and projecting axially inwardly beyond said follower ring, a bearing plate movably secured to the outer end of said shaft, a second bearing of the same size as said first bearing supported upon said bearing plate and engaged with the outer end of said insert to support the outer side of said hub, a first set of angularly spaced axially extending coil springs bearing between said bearing plate and the outer end of said sleeve, a second set of angularly spaced axially extending coil springs bearing between said bearing plate and said follower ring, an axially cammed finger projecting from the inner end of said sleeve, an actuating ring rotatably mounted on said shaft between said finger and said flange and having a cam notch coacting wit hsaid finger, and an actuating finger projetcing rigidly from said actuating ring through said notch in said flange to limit rotation of said actuating ring on said shaft and adapted to be engaged by a clutch tripping pawl.

2. A clutch for a punch press having a shaft and a fly-wheel comprising, a splined end portion on said shaft, a collar on said shaft at the inner end of said splined portion and having a segmental notch therein, an inner bearing supported on said collar, a chambered hub on said fly-wheel supported on its inner side on said bearing, a first ring secured within said hub portion and having radially inwardly projecting teeth formed around its interior and spaced radially outwardly from said splined portion, a sleeve axially slidably and non-rotatably mounted on said splined portion, a first set of teeth on said sleeve adapted to coact with said teeth on said first ring and having peripheral clearance therewith, an annular insert removably secured to the outer side of said hub and projecting thereinto, a second ring secured to the inner end of said insert and having radially inwardly facing teeth formed around its interior spaced axially outwardly from said first ring, said first and second rings and the teeth thereon being of identical size and number and being secured to said hub in angularly off-set position whereby the teeth on one ring overlap the space between the teeth on the other ring, a second set of teeth formed on said sleeve and spaced axially outwardly from said second ring, said first and second sets of teeth on said sleeve being axially and angularly aligned, a follower ring sleeved around the second set of teeth on said sleeve and having internal jaws fitting between said second set of teeth, locking teeth on the inner ends of said jaws and projecting axially inwardly beyond said follower ring, a bearing plate movably secured to the outer end of said shaft, a second bearing supported upon said bearing plate and engaged with the outer end of said insert to support the outer side of the said hub, a first set of springs bearing between said bearing plate and the outer end of said sleeve, a second set of springs bearing between said bearing plate and said follower ring, an axially cammed finger projecting from the inner end of said sleeve, an actuating ring rotatably mounted on said shaft between said finger and said flange and having a cam notch coacting with said finger, and an actuating finger projecting rigidly from said actuating ring through said notch in said flange to limit rotation of said actuating ring on said shaft and adapted to be engaged by a clutch tripping pawl.

3. A clutch for a press machine having a shaft and a fly-wheel comprising, a splined end portion on said shaft, a collar on said shaft at the inner end of said splined portion and having a segmental notch therein, an inner bearing supported on said collar, a chambered hub on said fly-wheel supported on its inner side on said bearing, a first ring secured within said hub portion and having radially inwardly projecting teeth formed around its interior and spaced radially outwardly from said shaft, a sleeve axially slidably and non-rotatably mounted on said splined portion, a first set of teeth on said sleeve adapted to coact with said teeth on said first ring, the teeth on said ring and sleeve having peripheral clearance to facilitate meshing, an annular insert removably secured to said hub and projecting into the outer end thereof, a second ring secured to said insert and having radially inwardly facing teeth formed around its interior, the teeth on said first and second rings being of identical size and number and being connected to said hub in angularly offset position whereby the teeth on one ring overlap the space between the teeth on the other ring, a second set of teeth formed on said sleeve and spaced axially outwardly from said second ring, said first and second sets of teeth on said sleeve being axially and angularly aligned, a follower ring sleeved around the second set of teeth on said sleeve and having internal jaws fitting between said second set of teeth, locking teeth on the inner ends of said jaws and projecting axially inwardly beyond said follower ring to engage between the teeth on said second ring, a second bearing movably secured to the outer end of said shaft and engaged with the outer end of said insert to support the outer side of said hub, a first set of angularly spaced springs compressed between the outer end of said shaft and the outer end of said sleeve, a second set of angularly spaced springs compressed between the outer end of said shaft and said follower ring, an axially cammed finger projecting from the inner end of said sleeve, and means rotatably mounted on said shaft and having a cam notch coacting with said finger and projecting rigidly through said notch in said flange to limit rotation of said means on said shaft and adapted to be engaged by a clutch tripping pawl.

4. A clutch for a press machine having a shaft and a fly-wheel comprising, a splined end portion on said shaft, a collar on said shaft at the inner end of said splined portion and having a segmental notch therein, an inner bearing supported on said collar, a chambered hub on said fly-wheel supported on its inner side on said bearing, a first ring secured within said hub portion and having radially inwardly projecting teeth formed around its interior and spaced radially outwardly from said shaft, a sleeve axially slidably and non-rotatably mounted on said splined portion, a first set of teeth on said sleeve adapted to coact with said teeth on said first ring, the teeth on said ring and sleeve having peripheral clearance to facilitate meshing, an annular insert removably secured to said hub and projecting into the outer end thereof, a second ring secured to said insert and having radially inwardly facing teeth formed around its interior, the teeth on said first and second rings being of identical size and number and being connected to said hub in angularly off-set position whereby the teeth on one ring overlap the space between the teeth on the other ring, a second set of teeth formed on said sleeve and spaced axially outwardly from said second ring, a follower ring sleeved around the second set of teeth on said sleeve and having internal jaws fitting between said second set of teeth, locking teeth on the inner ends of said jaws and projecting axially inwardly beyond said follower ring to engage between the teeth on said second ring, a second bearing movably secured to the outer end of said shaft and engaged with the outer end of said insert to support the outer side of said hub, a first set of angularly spaced springs compressed between the outer end of said shaft and the outer end of said sleeve, a second set of angularly spaced springs compressed between the outer end of said shaft and said follower ring, an axially cammed finger projecting from the inner end of said sleeve, and means rotatably mounted on said shaft and having a cam notch coacting with said finger and projecting rigidly through said notch in said flange to limit rotation of said means on said shaft and adapted to be engaged by a clutch tripping pawl.

5. A clutch for a press machine having a shaft and a fly-wheel comprising, a splined portion on said shaft, a collar on said shaft at the end of said splined portion, a bearing supported on said collar, a chambered hub on said fly-wheel supported on one side on said bearing, a first ring of teeth within said hub portion projecting radially inwardly around its interior and spaced radially outwardly from said splined portion, a sleeve axially slidably and non-rotatably mounted on said splined portion, a first set of teeth on said sleeve adapted to coact with said first ring of teeth and having angular clearance therewith, a second ring of teeth within said hub portion and facing radially inwardly around its interior, the teeth of said first and second rings being of identical size and number and being located in angularly off-set position whereby the teeth in one ring overlap the space between the teeth in the other ring, a second set of teeth formed on said sleeve and spaced axially outwardly from said second ring of teeth, a follower ring sleeved around the second set of teeth on said sleeve and having internal jaws fitting between said second set of teeth, locking teeth on said follower ring adapted to move axially into engagement with said second ring of teeth, a second bearing supported upon said shaft to support the other side of said hub, a first set of angularly spaced axially extending springs compressed between said shaft and said sleeve and biasing the first set of teeth thereon toward said first ring of teeth, a second set of angularly spaced axially extending springs compressed between said shaft and said follower ring and biasing said locking teeth toward said second ring of teeth, an axially cammed surface on the opposite end of said sleeve from said springs, and means selectively engageable with said cammed surface to retract said sleeve against said springs, said sleeve and follower ring having axially overlapping portions whereby retracting motion of said sleeve retracts said follower ring.

6. A clutch for a press machine having a shaft and a fly-wheel comprising, a splined portion on said shaft, a collar on said shaft at the end of said splined portion, a bearing supported on said collar, a chambered hub on said fly-wheel supported on said bearing, a first ring of teeth within said hub portion projecting radially inwardly around its interior and spaced radially outwardly from said splined portion, a sleeve axially slidably and non-rotatably mounted on said splined portion, a first set of teeth on said sleeve adapted to coact with said first ring of teeth and having angular clearance therewith, a second ring of teeth within said hub portion and facing radially inwardly around its interior, the teeth of said first and second rings being of identical size and number and being located in angularly off-set position whereby the teeth in one ring overlap the space between the teeth in the other ring, a second set of teeth formed on said sleeve and spaced axially outwardly from said second ring of teeth, a follower ring sleeved around the second set of teeth on said sleeve and having internal jaws fitting between said second set of teeth, locking teeth on said follower ring adapted to move axially into engagement with said second ring of teeth, a first set of angularly spaced axially extending springs compressed between said shaft and said sleeve and biasing the first set of teeth thereon toward said first ring of teeth, a second set of angularly spaced axially extending springs compressed between said shaft and said follower ring and biasing said locking teeth toward said second ring of teeth, an axially cammed surface on the opposite end of said sleeve from said springs, and means selectively engageable with said cammed surface to retract said sleeve against said springs, said sleeve and follower ring having axially overlapping portions whereby retracting motion of said sleeve retracts said follower ring.

7. Clutch structure for releasably connecting a rotatable driving member and co-axially arranged driven member comprising, a sleeve splined on said driven member and having axially spaced and aligned sets of teeth formed around its periphery, means forming axially spaced rings of internal driving teeth on said driving member, said driving teeth surrounding said sleeve and being spaced sufficiently to permit one set of teeth on said sleeve to move axially from between said rings of driving teeth into driving engagement with one ring of driving teeth, said rings of driving teeth being identical in size and number but being angularly off-set, a follower ring embracing the second set of teeth on said sleeve and having internal jaws engaged between said second set of teeth, said follower ring being positioned on the opposite side of said driving teeth from said one set of teeth on said sleeve, locking teeth on the ends of said jaws adapted to engage the second ring of teeth on said driving member, first spring means biasing said sleeve axially to engage the first set of teeth thereon with the first ring of teeth on said driving member, a second spring means independently biasing said follower ring to engage the teeth thereon with the second ring of teeth on said driving member, axially overlapping portions on said sleeve and follower ring adapted to move said follower ring away from said driving teeth with said sleeve, and clutch tripping means adapted to move said sleeve axially against the pressure of said springs.

8. Clutch structure for releasably connecting a rotatable driving member and co-axially arranged driven member comprising, a sleeve splined on one of said members and having axially spaced and aligned sets of teeth formed around its periphery, means forming axially spaced rings of internal teeth on the other of said members, said rings of teeth surrounding said sleeve and being spaced sufficiently to permit one set of teeth on said sleeve to move axially from between said rings of teeth into driving engagement with one of the said rings of teeth, said rings of teeth being identical in size and number but being angularly offset, a follower ring embracing the second set of teeth on said sleeve and having internal jaws engaged between said second set of teeth, said follower ring being positioned on the opposite side of said rings of teeth from said one set of teeth on said ring, locking teeth on the ends of said jaws adapted to engage the second ring of teeth on the other of said members, first spring means biasing said sleeve axially to engage the first set of teeth thereon with the first ring of teeth on the other of said members, a second spring means independently biasing said follower ring to engage the teeth thereon with the second ring of teeth on the other of said members, axially overlapping portions on said sleeve and follower ring adapted to move said follower ring away from said rings of teeth with said sleeve, and clutch tripping means adapted to move said sleeve axially against the pressure of said springs.

9. Clutch structure for releasably connecting a rotatable driving member and co-axially arranged driven member comprising, a sleeve splined on one of said members and having axially spaced sets of teeth formed around its periphery, means forming axially spaced rings of internal teeth on the other of said members, said rings of teeth surrounding said sleeve and being spaced sufficiently to permit one set of teeth on said sleeve to move axially from between said rings of teeth into driving engagement with one of the said rings of teeth, a follower ring embracing the second set of teeth on said sleeve and having internal jaws engaged between said second set of teeth, said follower ring being positioned on the opposite side of said rings of teeth from said one set of teeth on said follower ring, locking teeth on said follower ring adapted to engage the second ring of teeth on the other of said members, first spring means biasing said sleeve axially to engage the first set of teeth thereon with the first ring of teeth on the other of said members, a second spring means independently biasing said follower ring to engage the teeth thereon with the second ring of teeth on the other of said members, axially overlapping portions on said sleeve and follower ring adapted to move said follower ring away from said rings of teeth with said sleeve, and clutch tripping means adapted to move said sleeve axially against the pressure of said spring means.

10. Clutch structure for releasably connecting a rotatable driving member and co-axially arranged driven member comprising, a sleeve having non-rotatable sliding engagement with one of said members and having axially spaced annular sets of teeth formed thereon, means forming axially spaced rings of teeth on the other of said members, said rings of teeth being opposite said sleeve and being spaced sufficiently to permit one set of teeth on said sleeve to move axially from between said rings of teeth into driving engagement with one of said rings of teeth, said rings of teeth being identical in size and number but being angularly offset, a follower ring axially slidably mounted on said sleeve and having jaws engaged between the second set of teeth thereon, locking teeth on the ends of said jaws adapted to lockingly engage the second ring of teeth on the other of said members, first spring means biasing said sleeve axially to engage the first set of teeth thereon with the first ring of teeth on the other of said members, a second spring means independently biasing said follower ring to engage the teeth thereon with the second ring of teeth on said other of said members, axially overlapping portions on said sleeve and follower ring adapted to move said follower ring away from said rings of teeth with said sleeve, and clutch tripping means adapted to move said sleeve axially against the pressure of said spring means.

11. Clutch structure for releasably connecting a rotatable driving member and co-axially arranged driven member comprising, a sleeve having non-rotatable sliding engagement with one of said members and having axially spaced annular sets of teeth formed thereon, means forming axially spaced rings of teeth on the other of said members, said rings of teeth being opposite said sleeve and being spaced sufficiently to permit one set of teeth on said sleeve to move axially from between said rings of teeth into driving engagement with one of said rings of teeth, a follower ring axially slidably mounted on said sleeve and having jaws engaged between the second set of teeth thereon, locking teeth on said follower ring adapted to lockingly engage the second ring of teeth on the other of said members, first spring means biasing said sleeve axially to engage the first set of teeth thereon with the first ring of teeth on the other of said members, a second spring means independently biasing said follower ring to engage the teeth thereon with the second ring of teeth on said other of said members, axially overlapping portions on said sleeve and follower ring adapted to move said follower ring away from said driving teeth with said sleeve, and clutch tripping means adapted to move said sleeve axially against the pressure of said spring means.

12. Clutch structure for releasably connecting an outer member rotatably mounted about the axis of an inner rotatable member comprising, axially spaced rings of internal teeth carried by said outer member, a sleeve splined on said inner member and slidable thereon within said rings of teeth, an initially engageable set of teeth on said sleeve engageable with one of said rings of teeth on said outer member, a follower ring non-rotatably and slidably mounted on said sleeve, locking teeth carried by said follower ring and engageable with the second ring of teeth on said outer member, said rings of teeth being angularly disposed whereby said set of teeth on said sleeve and said locking teeth may be in mesh concurrently with said rings of teeth, said teeth on said sleeve and said first ring of teeth having angular clearance facilitating easy engagement thereof, the trailing edges of the teeth in the second of said ring meshing with the leading edges of said locking teeth only when the teeth on said sleeve are in meshed driving engagement with said first ring of teeth, spring means biasing said sleeve and said follower ring independently toward tooth engaging position, means for shifting said sleeve axially toward tooth disengaging position, and axially overlapping portions on said sleeve and follower ring whereby tooth disengaging motion of said sleeve will move said follower ring to tooth disengaging position.

13. Clutch structure for releasably connecting a first member rotatably mounted about the axis of a second rotatable member comprising, axially spaced rings of teeth carried by one of said members, said rings of teeth being identical and angularly displaced, a sleeve having non-rotatable sliding engagement with the other of said members and slidable thereon, an initially engageable set of teeth on said sleeve engageable with one of said rings of teeth on said one member, a follower ring non-rotatably and slidably mounted on said sleeve, locking teeth carried by said follower ring and engageable with a second ring of teeth on said one member, said rings of teeth and set of teeth and locking teeth being angularly disposed whereby said set of teeth on said sleeve and said locking teeth may be in mesh concurrently with said rings of teeth, said teeth on said sleeve and said one ring of teeth having angular clearance facilitating easy engagement thereof, the trailing edges of said second ring of teeth meshing with the leading edges of said locking teeth only when the leading edges of said first ring of teeth are in driving engagement with the trailing edges of said set of teeth, spring means biasing said sleeve and said follower ring independently toward tooth engaging position, means for shifting said sleeve axially toward tooth disengaging position, and axially overlapping portions on said sleeve and follower ring whereby tooth disengaging motion of said sleeve will move said follower ring to tooth disengaging position.

14. Clutch structure for releasably connecting a first member rotatably mounted about the axis of a second rotatable member comprising, axially spaced rings of teeth carried by one of said members, a sleeve having non-rotatable sliding engagement with the other of said members and slidable thereon, an initially engageable set of teeth on said sleeve engageable with one of said rings of teeth on said one member, a follower ring non-rotatably and slidably mounted on said sleeve, locking teeth carried by said follower ring and engageable with a second ring of teeth on said one member, said rings of teeth and set of teeth and locking teeth being angularly disposed whereby said set of teeth on said sleeve and said locking teeth may be in mesh concurrently with said rings of teeth, said teeth on said sleeve and said one ring of teeth having angular clearance facilitating easy engagement thereof, the trailing edges of said second ring of teeth meshing with the leading edges of said locking teeth only when the leading edges of said first ring of teeth are in driving engagement with the trailing edges of said set of teeth, spring means biasing said sleeve and said follower ring independently toward tooth engaging position, means for shifting said sleeve axially toward tooth disengaging position, and axially overlapping portions on said sleeve and said follower ring whereby tooth disengaging motion of said sleeve will move said follower ring to tooth disengaging position.

References Cited in the file of this patent

UNITED STATES PATENTS

| | | |
|---|---|---|
| 2,140,216 | Wissman | Dec. 13, 1938 |
| 2,398,407 | Brownyer | Apr. 16, 1946 |
| 2,403,594 | Gilliard | July 9, 1946 |
| 2,529,492 | Gilbert | Nov. 14, 1950 |
| 2,535,388 | Burks et al. | Dec. 26, 1950 |
| 2,571,474 | Ochs et al. | Oct. 16, 1951 |
| 2,627,955 | Perkins | Feb. 10, 1953 |